United States Patent [19]

Iijima

[11] Patent Number: 5,493,187
[45] Date of Patent: Feb. 20, 1996

[54] METHOD AND APPARATUS FOR CONTROLLING BRUSHLESS MOTOR

[75] Inventor: Masahiko Iijima, Koriyama, Japan

[73] Assignee: Yamamoto Electric Corporation, Sukagawa, Japan

[21] Appl. No.: 62,613

[22] Filed: May 18, 1993

[51] Int. Cl.$^6$ ..................................................... H02P 1/18
[52] U.S. Cl. .......................... 318/254; 318/138; 318/439; 388/811
[58] Field of Search ..................................... 318/254, 138, 318/432, 439, 606, 587, 599, 811; 388/801, 831, 820, 829, 811, 819, 902, 907.5, 421, 814–815; 361/51, 156

[56] References Cited

U.S. PATENT DOCUMENTS

| | | | |
|---|---|---|---|
| 4,242,619 | 12/1980 | Nakamura et al. | 388/811 |
| 4,447,767 | 5/1984 | Holt | 388/831 |
| 4,482,850 | 11/1984 | Sonoda et al. | 388/820 |
| 4,555,651 | 11/1985 | Melocik et al. | 388/801 |
| 4,665,350 | 5/1987 | Angi et al. | 318/254 |
| 4,665,487 | 5/1987 | Ogawa et al. | 318/587 |
| 4,677,356 | 6/1987 | Tsuneda et al. | 318/432 |
| 4,772,829 | 9/1988 | Pickering et al. | 318/139 |
| 4,949,021 | 8/1990 | Rozman et al. | 318/254 |
| 4,949,393 | 8/1990 | Ohmori et al. | 388/815 |
| 4,950,968 | 8/1990 | Ogura | 318/599 |
| 5,046,123 | 9/1991 | Horino | 388/811 |
| 5,300,866 | 4/1994 | Yasohara et al. | 318/254 |

*Primary Examiner*—John W. Cabeca
*Attorney, Agent, or Firm*—Nikaido, Marmelstein, Murray & Oram

[57] ABSTRACT

The rotation speed of a brushless motor is detected to generate a signal synchronizing with the rotation of the motor, and, on the basis of the synchronizing signal, a plurality of duty signals representing respectively different duty factors are generated. One of the plural duty signals is selected according to the detected rotation speed of the motor, and, on the basis of the selected duty signal, a corresponding exciting signal is supplied to the motor. The higher the detected rotation speed of the motor, the selected duty signal represents a larger duty factor.

6 Claims, 4 Drawing Sheets

METHOD AND APPARATUS FOR CONTROLLING BRUSHLESS MOTOR

BACKGROUND OF THE INVENTION

1. Field of the Invention

This invention relates to a method and apparatus for controlling a brushless motor, and more particularly to a method and apparatus of the kind described above which can drive a brushless motor with high operating efficiency.

2. Description of the Related Art

A prior art method commonly used hitherto for controlling a brushless motor has been such that an exciting signal representing a duty ratio or duty factor of ⅓ is supplied to the brushless motor over its entire rotation speed range including its low rotation speed range and its high rotation speed range so as to control the rotation speed of the brushless motor according to the value of the current.

SUMMARY OF THE INVENTION

In the prior art brushless motor control method, it has been a common practice to increase the current value in order to increase the rotation speed of the brushless motor in its high rotation speed range or to decrease the number of turns of the stator coil of the brushless motor in order to increase the current value. However, this decrease in the number of turns of the stator coil of the brushless motor has given rise to the problem that the current is wasted in the low rotation speed range of the brushless motor, resulting in degradation of the operating efficiency of the brushless motor.

It is an object of the present invention to provide a method and apparatus for controlling a brushless motor that can obviate the problem encountered in the case of the related art.

Another object of the present invention is to provide a brushless motor control method and apparatus that can drive the brushless motor with high operating efficiency in both of its low rotation speed range and its high rotation speed range and that can further increase the rotation speed of the brushless motor in its high rotation speed range.

According to one aspect of the present invention, there is provided a method for controlling a brushless motor, which includes the step of, with the increase in the rotation speed of the brushless motor, selecting an exciting signal representing a larger duty factor, and supplying the selected exciting signal to the motor.

According to an example of the present invention, the duty factor represented by the exciting signal is selected to be ⅓ when the rotation speed of the motor is lower than a predetermined setting, while the duty factor is selected to be ½ when the rotation speed of the motor exceeds the predetermined setting.

According to another aspect of the present invention, there is provided a method for controlling a brushless motor, which includes the step of, with the increase in the rotation speed of the brushless motor, selecting an exciting signal representing a larger angle of lead with respect to the magnetic pole of the rotor of the brushless motor, and supplying the selected exciting signal to the stator coil of the motor.

According to still another aspect of the present invention, there is provided an apparatus for controlling a brushless motor, which includes a unit for detecting the rotation speed of the brushless motor, a unit for generating a signal synchronizing with the rotation of the motor, a unit for generating, on the basis of the synchronizing signal, a plurality of duty signals representing respectively different duty factors, a unit for selecting, according to the motor speed detected by the speed detecting unit, one of the plural duty signals generated from the duty signal generating unit, and a unit for generating, on the basis of the selected duty signal, an exciting signal to be supplied to the motor, wherein the duty signal selecting unit selects the duty signal representing a larger duty factor when the rotation speed of the motor detected by the speed detecting unit is higher.

According to yet another aspect of the present invention, there is provided an apparatus for controlling a brushless motor, which includes a unit for detecting the rotation speed of the brushless motor, a unit for generating a signal synchronizing with the rotation of the motor, a unit for generating, on the basis of the synchronizing signal, a plurality of angle-of-lead signals representing respectively different angles of lead with respect to the magnetic pole of the rotor of the motor, a unit for selecting, according to the motor speed detected by the speed detecting unit, one of the plural angle-of-lead signals generated by the angle-of-lead signal generating unit, and a unit for generating, on the basis of the selected angle-of-lead signal, an exciting signal to be supplied to the stator coil of the motor, wherein the angle-of-lead signal selecting unit selects the angle-of-lead signal representing a larger angle of lead when the rotation speed of the motor detected by the speed detecting unit is higher.

In the method and apparatus for controlling a brushless motor according to the present invention, at least two kinds of signals representing respectively different duty factors and/or signals representing respectively different angles of lead with respect to the magnetic pole of the rotor of the brushless motor are prepared to be supplied for exciting the stator coil of the motor, and, with the increase in the rotation speed of the motor, the exciting signal is changed over to that representing a larger duty factor and/or that representing a larger angle of lead.

The applicant has noted the fact that the smaller the duty factor represented by the exciting signal and the smaller the angle of lead represented by the exciting signal in the low rotation speed range of the brushless motor, the rotation speed of the brushless motor can be efficiently increased even when the current value is small, while the larger the duty factor and the larger the angle of lead in the high rotation speed range of the brushless motor, the rotation speed of the brushless motor can be efficiently increased. The above fact teaches that, when the duty factor and/or the angle of lead represented by the exciting signal is changed over to the larger one with the increase in the rotation speed of the brushless motor, the motor can be highly efficiently controlled to be able to operate in a higher rotation speed range without the necessity for decreasing the number of turns of the stator coil and also without supplying wasteful current in both the low and high rotation speed ranges.

DESCRIPTION OF THE PREFERRED EMBODIMENTS

Preferred embodiments of the present invention will now be described by reference to the drawings.

Figure 1:
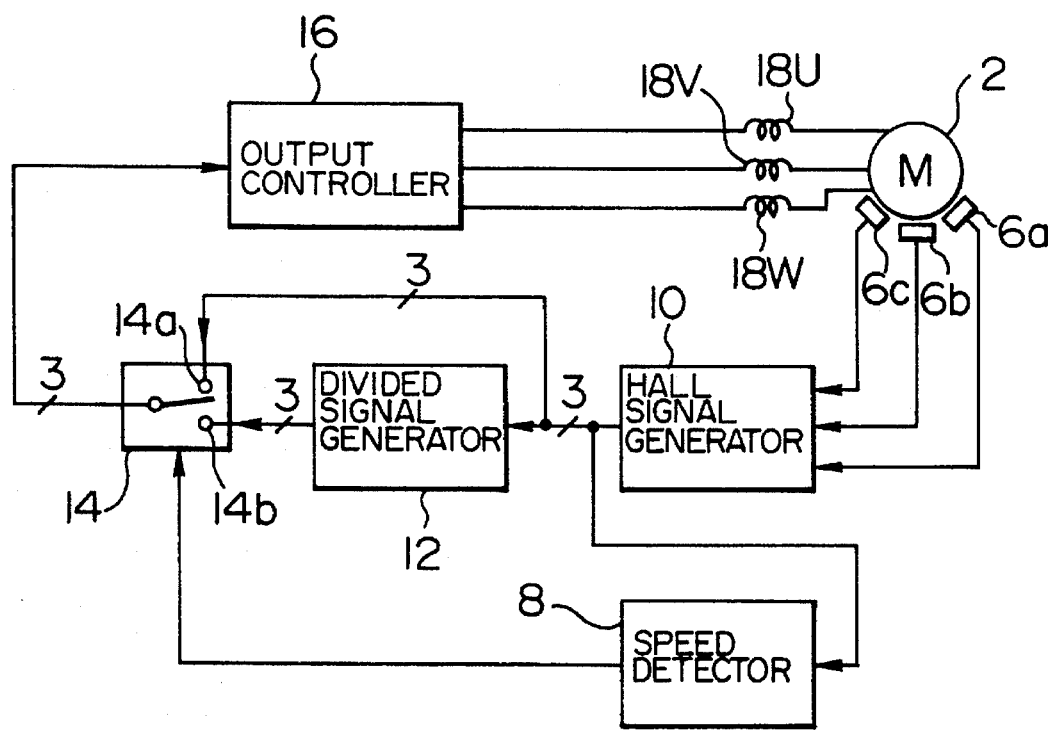
FIG. 1 is a block diagram showing the structure of a first embodiment of the brushless motor control apparatus according to the present invention.
Figure 2A:
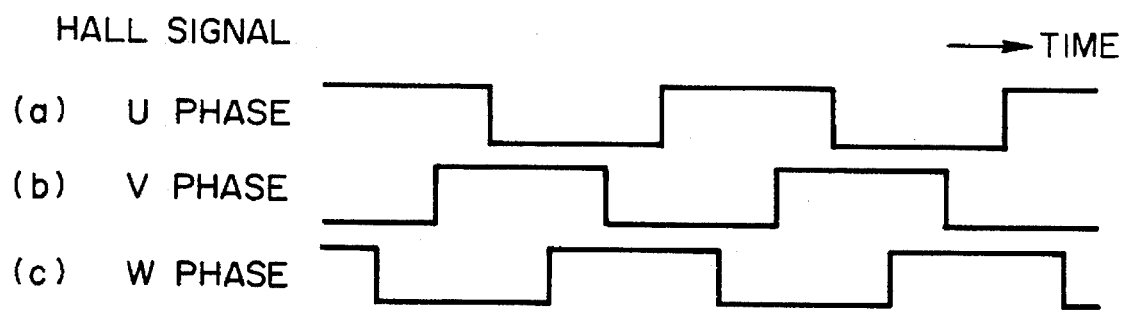
FIGS. 2A, 2B and 2C are timing charts showing signal waveforms appearing at various parts in FIG. 1.
Figure 2B:
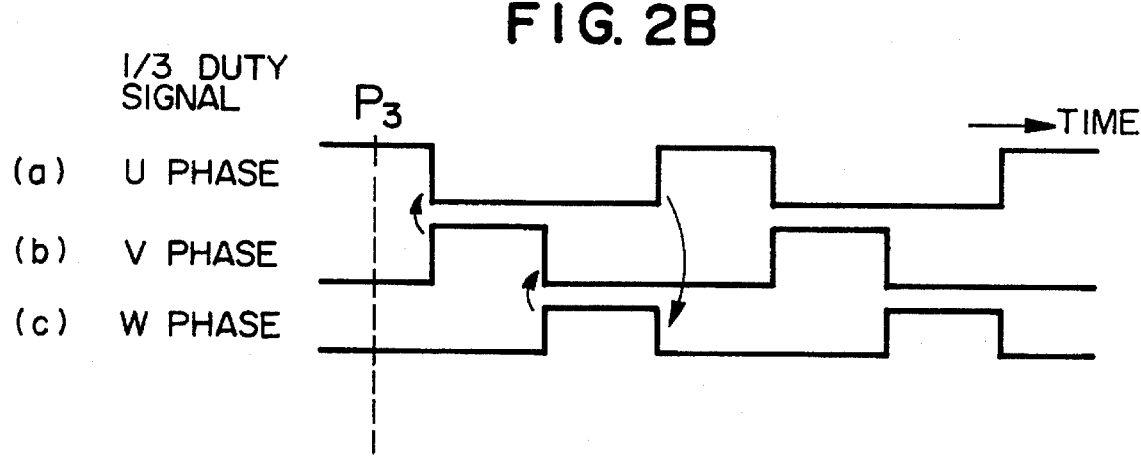
Figure 2C:
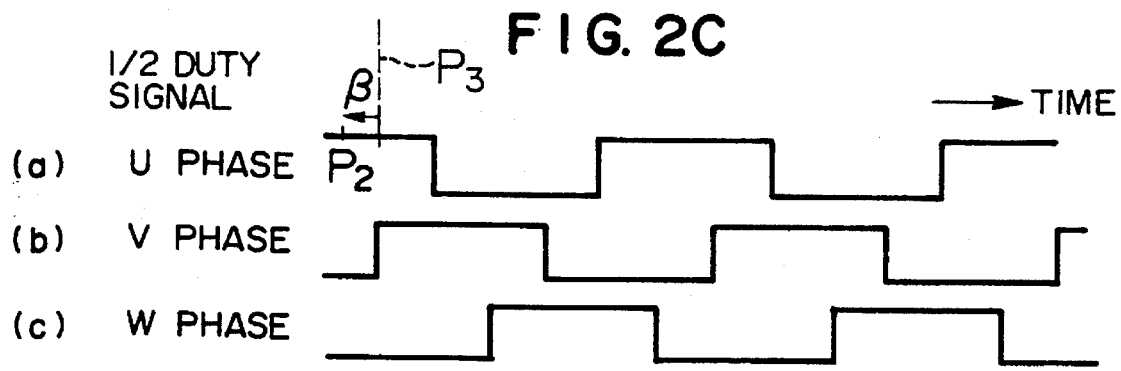

FIG. 1 is a block diagram showing the structure of a first embodiment of the brushless motor control apparatus according to the present invention, and FIGS. 2A, 2B and 2C show signal waveforms appearing at various parts in FIG. 1. Referring to FIG. 1, a plurality of rotor pole position detectors, for example, three Hall sensors 6a, 6b and 6c for detecting the position of the magnetic pole of the rotor of a brushless motor 2 are mounted on the inner peripheral surface of the stator disposed opposite to the rotor, and a plurality of pole pieces are provided on the outer periphery of the rotor.

Figure 4A:
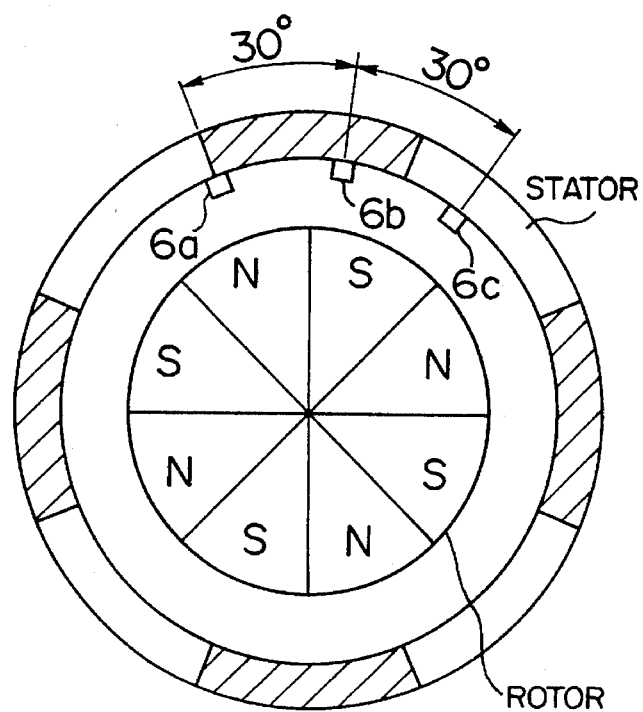
FIGS. 4A and 4B show the position of Hall sensors relative to the magnetic poles of the rotor in the first embodiment and a second embodiment respectively of the present invention.
Figure 4B:
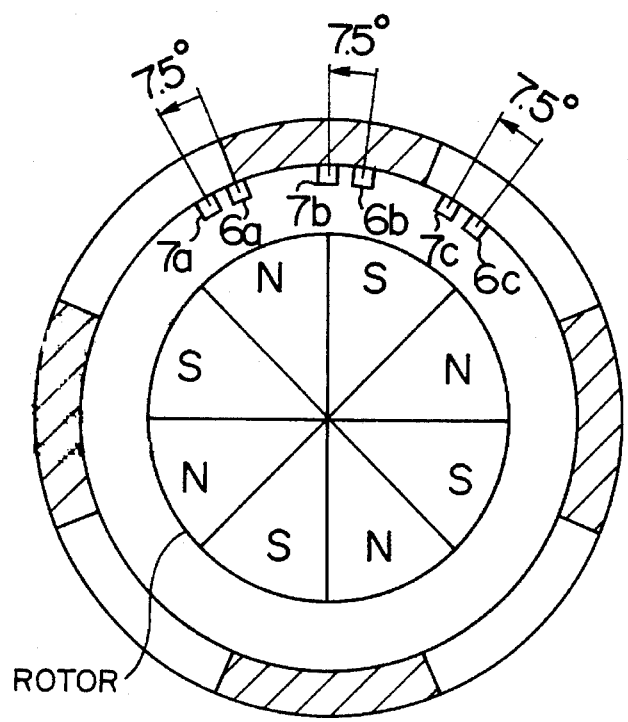

The Hall sensors 6a to 6c generate output pulses in response to the magnetic flux emanating from the pole pieces of the rotor, and those output pulses are supplied as inputs to a Hall signal generator circuit 10. The Hall sensors 6a to 6c are disposed around the rotor along the direction of rotation of the rotor in a relation circumferentially spaced apart from each other by an angle of, for example, 30° as shown in FIG. 4A. The brushless motor 2 is of the four pole type as illustrated in FIGS. 4A and 4B.

In response to the output pulses supplied from the Hall sensors 6a to 6c, the Hall signal generator circuit 10 generates a Hall signal that is a three-phase rectangular waveform signal as shown in FIG. 2A. This Hall signal is applied, on one hand, to both of a divided signal generator circuit 12 and a rotation speed detector 8, and, on the other hand, to one terminal 14a of a switch 14 as a ½ duty signal having a waveform as shown in FIG. 2C. The Hall signal has a wavelength corresponding to, for example, 45° in terms of the angular rotation of the rotor of the brushless motor 2.

The divided signal generator circuit 12 converts the duty factor of the U phase, V phase and W phase of the Hall signal into ⅓ and generates a divided signal of U phase, V phase and W phase respectively. This divided signal is a ⅓ duty signal having a waveform as shown in FIG. 2B.

It will be seen in FIG. 2B that the falling edge of the Hall signal of U phase is synchronized with the rising edge of the Hall signal of V phase, the falling edge of the Hall signal of V phase is synchronized with the rising edge of the Hall signal of W phase, and the falling edge of the Hall signal of W phase is synchronized with the rising edge of the Hall signal of U phase. The ⅓ duty signal is applied to the other terminal 14b of the switch 14.

In response to the application of the output of the rotation speed detector 8, the switch 14 selects one of the Hall signal and the ⅓ duty signal applied to its terminals 14a and 14b respectively. The rotation speed detector 8 detects the rotation speed of the motor 2 on the basis of the period (frequency) of the output pulse signal generated from the Hall sensor 6a, and the detector output signal indicative of whether or not the rotation speed of the motor 2 is higher than a predetermined setting is applied to the switch 14. When the detected rotation speed of the motor 2 is higher than the predetermined setting, the switch 14 selects the Hall signal, while when the detected rotation speed of the motor 2 is lower than the predetermined setting, the switch 14 selects the ⅓ duty signal. The signal selected by the switch 14 is applied to an output controller 16.

Therefore, when the detected rotation speed of the motor 2 is higher than the predetermined setting, the exciting signal representing the duty factor of ½ shown in FIG. 2C is applied from the output controller 16 to stator exciting coils 18U, 18V and 18W of the motor 2, while when the detected rotation speed of the motor 2 is lower than the predetermined setting, the exciting signal representing the duty factor of ⅓ shown in FIG. 2B is applied from the output controller 16 to the stator exciting coils 18U, 18V and 18W.

Figure 3:
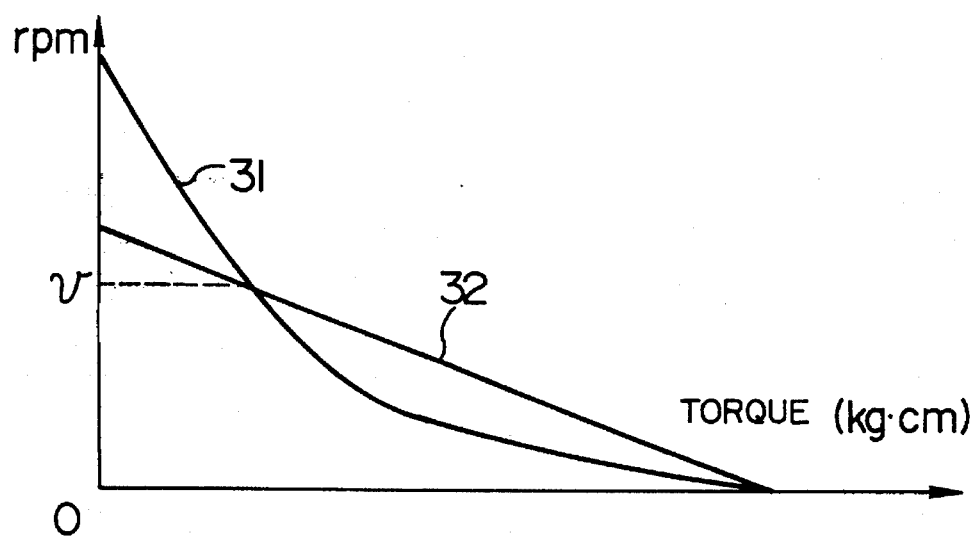
FIG. 3 is a graph showing the relation between the motor torque and the motor rotation speed when the motor exciting signal represents different duty factors.

FIG. 3 is a graph showing the relation between the rotation speed (rpm) and the torque (Kg-cm) of the motor 2 at different duty factors of the exciting signal. In FIG. 3, the curves 31 and 32 indicate the speed-torque characteristic when the duty factors are ½ and ⅓ respectively.

It will be apparent from FIG. 3 that, at the same value of the motor torque, the rotation speed of the motor 2 in its low rotation speed range is higher when the duty factor of the exciting signal is ⅓ than when the duty factor of the exciting signal is ½, and this relation is inverted in the high rotation speed range of the motor 2.

Figure 5:
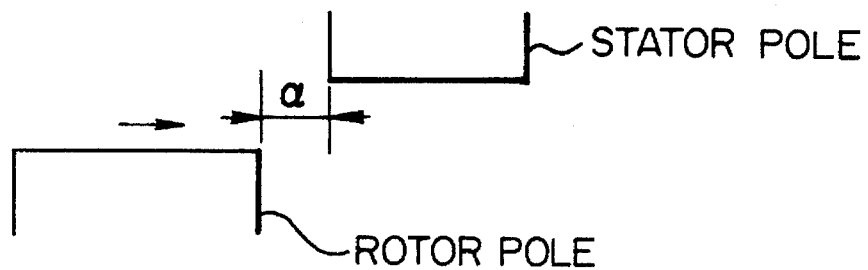
FIG. 5 illustrates the angle of lead.

Now, the duty signal of one phase shown in FIG. 2B will be compared with that of the same phase shown in FIG. 2C. For example, the ⅓ duty signal of U phase shown in FIG. 2B will be compared with the ½ duty signal of U phase shown in FIG. 2c. It will be seen that the phase $P_2$ at the center of the high-level period of the ½ duty signal is advanced by an amount β relative to the phase $P_3$ at the center of the high-level period of the ⅓ duty signal, and, because of the above relation, it can be considered that the angle of lead (the angle α in FIG. 5) is also advanced by the amount β. The same applies also to the other phases.

Therefore, it will be seen that, by supplying the exciting signal representing the duty factor of ⅓ in the low rotation speed range of the motor 2, the angle of lead as well as the current value can be decreased as compared to the case of supplying the exciting signal representing the duty factor of ½, so that the rotation speed of the motor 2 can be increased with high efficiency in the low rotation speed range of the motor 2. On the other hand, it will be also seen that, by supplying the exciting signal representing the duty factor of ½ in the high rotation speed range of the motor 2, the current value as well as the angle of lead can be increased as compared to the case of supplying the exciting signal representing the duty factor of ⅓, so that the rotation speed of the motor 2 can also be increased with high efficiency in the high rotation speed range of the motor 2. Thus, the brushless motor 2 can operate with high efficiency without wastefully consuming the current.

The rotation speed value v shown in FIG. 3 is preferably selected as the predetermined setting that is based to change over the duty factor and/or the angle of lead described above.

Figure 6:
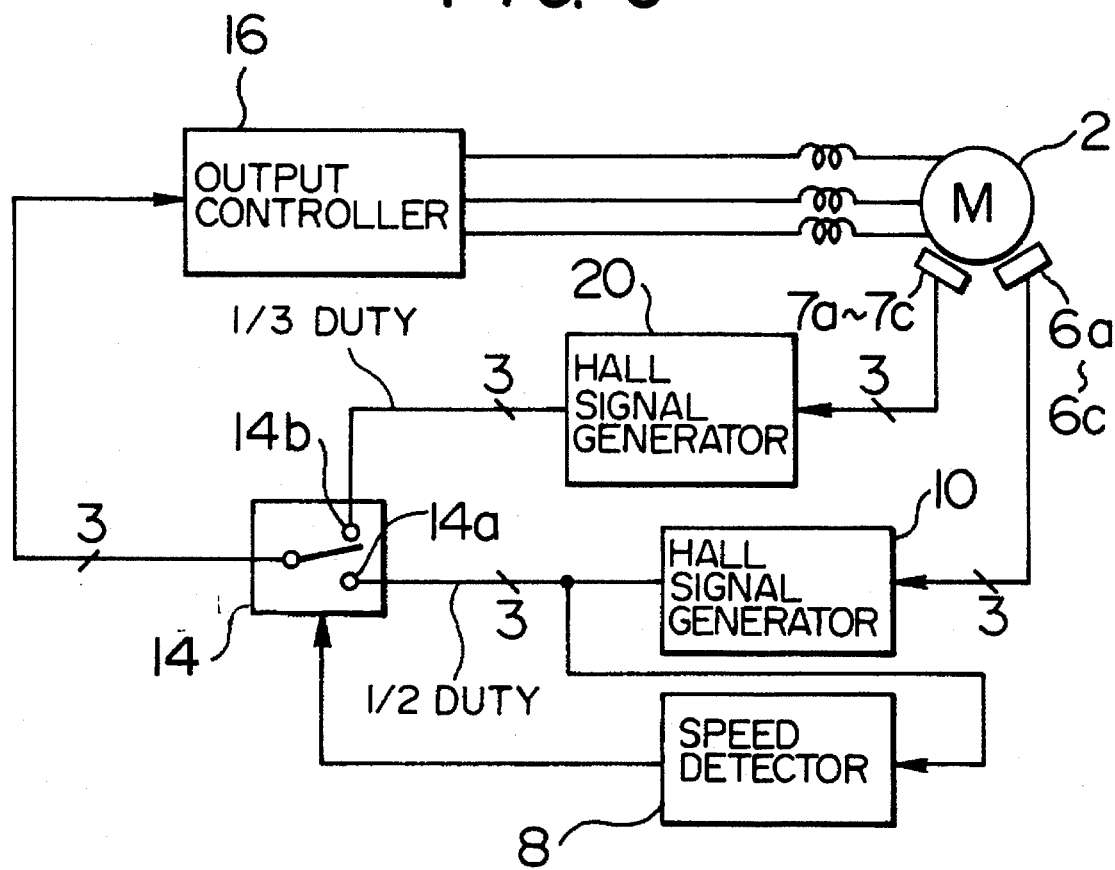
FIG. 6 is a block diagram showing the structure of the second embodiment of the brushless motor control apparatus according to the present invention.

FIG. 6 shows a second embodiment that is a partial modification of the first embodiment of the brushless motor control apparatus according to the present invention. In this second embodiment, the divided signal generator circuit 12 shown in FIG. 1 is eliminated, and two kinds of Hall sensors 6a to 6c and 7a to 7c for providing the exciting signals representing the duty factors of ½ and ⅓ respectively are provided. In FIG. 6, the same reference numerals are used to designate the same parts appearing in FIG. 1 to dispense with repetition of the same description. Referring to FIG. 4B, the Hall sensors 6a to 6c act to provide the ½ duty signal, while the Hall sensors 7a to 7c act to provide the ⅓ duty signal. The Hall sensors 7a to 7c are also disposed on the inner peripheral surface of the stator along the direction of rotation of the rotor in a relation circumferentially spaced apart from each other by an angle of, for example, 30° as shown in FIG. 4B. These Hall sensors 7a to 7c are displaced by an angle of, for example, 7.5° relative to the Hall sensors 6a to 6c respectively. It is apparent that the direction of displacement of the Hall sensors 7a to 7c may be inverted to that illustrated.

Output pulses from the Hall sensors 7a to 7c are supplied to a second Hall signal generator circuit 20 which generates the signal representing the duty factor of ⅓ shown in FIG. 2B. The operation of the second embodiment after the generation of the ⅓ duty signal is the same as that of the first embodiment, and the effect similar to that of the first embodiment is exhibited.

In the first and second embodiments of the present invention described above, the duty factors of the exciting signal in the low and high rotation speed ranges of the motor 2 are selected to be ⅓ and ½ respectively. However, it is apparent that the values of the duty factors are in no way limited to those described above and may be any other suitable ones, for example, 1/n and 1/m. In this case, it is merely required that both of n and m are positive integers, and there is the relation n>m between them.

In the aforementioned embodiments of the present invention, the duty factor and/or the angle of lead is changed over two stages according to the detected rotation speed of the motor. However, it is apparent that the duty factor and/or the angle of lead may be changed over three or more stages, and, with the increase in the rotation speed of the motor, the duty factor and/or the angle of lead may be increased. Further, when the motor is to be rotated in the reverse direction, the effect similar to that described already can be exhibited by merely inverting the polarity of the duty signal used.

It will be understood from the foregoing description of the method and apparatus for controlling the brushless motor according to the present invention that, in the low rotation speed range of the motor, the exciting signal representing the small duty factor and/or the small angle of lead is supplied so that the rotation speed of the motor can be increased with the small current value, while in the high rotation speed range, the exciting signal representing the large duty factor and/or the large angle of lead is supplied so that the rotation speed of the motor can also be increased. Thus, the present invention is advantageous in that an undesirable waste of the current can be obviated, and the brushless motor can operate with high efficiency. That is, the brushless motor can be controlled with high efficiency by changing over both the duty factor and the angle of lead according to the detected rotation speed of the motor.

What is claimed is:

1. An apparatus for controlling a multi-phase brushless motor, comprising:

speed detecting means for detecting a rotation speed of said brushless motor;

Hall sensors, a number of which is same as a phase number of said motor, for generating Hall signals of a duty factor of ½ in response to predetermined rotational angles of a rotor of said motor, respectively;

duty signal generating means for generating at least two kinds of duty signals for each phase of said motor having different duty factors and different lead angles representing different phase angles on the basis of said plurality of Hall signals;

selecting means for selecting, according to the rotation speed detected by said speed detecting means, one of said two kinds of duty signals for each phase of said motor representing a larger duty factor and a larger lead angle representing an advanced phase angle with an increase of the rotation speed of said motor; and exciting signal generating means for generating, on the basis of the selected duty signals for the respective phases of said motor, exciting signals for the phases of said motor to be supplied to said motor, respectively, wherein said phase number of said motor is 3, wherein said number of said Hall sensors is 3, wherein said three Hall sensors generate Hall signals of U-, V- and W-phases, respectively, wherein said duty signal generating means generates a signal which rises in synchronism with a rising of said U-phase Hall signal and falls in synchronism with a rising of said V-phase Hall signal as a U-phase duty signal with a duty factor of ⅓, a signal which rises in synchronism with a rising of said V-phase Hall signal and falls in synchronism with a rising of said W-phase Hall signal as a V-phase duty signal with a duty factor of ⅓, a signal which rises in synchronism with a rising of said W-phase Hall signal and falls in synchronism with a rising of said U-phase Hall signal as a W-phase duty signal with a duty factor of ⅓, a signal which is a phase inverted signal of said V-phase Hall signal as a U-phase duty signal with a duty factor of ½, a signal which is a phase inverted signal of said W-phase Hall signal as a V-phase duty signal with a duty factor of ½, and a signal which is a phase inverted signal of U-phase Hall signal as a W-phase duty signal with a duty factor of ½, and wherein said selecting means selects said U-, V- and W-phase duty signals with duty factors of ⅓ when the rotation speed of said motor is below said predetermined speed, and selects said U-, V- and W-phase duty signals with duty factors of ½ when the rotation speed of said motor is equal to or more than said predetermined speed.

2. An apparatus for controlling a multi-phase brushless motor, comprising:

speed detecting means for detecting a rotation speed of said brushless motor;

first set of Hall sensors, a number of which is same as a phase number of said motor, for generating Hall signals of a duty factor of ½ in response to first predetermined rotational angles of a rotor of said motor;

a second set of Hall sensors, a number of which is the same as the phase number of said motor, for generating Hall signals of a duty factor of ⅓ in response to second predetermined rotational angles of said rotor of said motor, said first set of Hall sensors being shifted from said second set of Hall sensors by a desired angle along a rotational direction of said rotor;

duty signal generating means for generating at least two kinds of duty signals for each phase of said motor having different duty factors and different lead angles representing different phase angles on the basis of said first and second sets of Hall signals, respectively;

selecting means for selecting, according to the rotation speed detected by said speed detecting means, one of said two kinds of duty signals for each phase of said motor representing a larger duty factor and a larger lead angle representing an advanced phase angle with an increase of the rotation speed of said motor; and exciting signal generating means for generating, on the basis of the selected duty signals for the phases of said motor, exciting signals for the phases of said motor to be supplied to said motor, respectively.

3. A brushless motor control apparatus according to claim 2, wherein said duty signal generating means generates, as one of said at least two kinds of duty signals, duty signals with duty factor of ½ for each phase of said motor on the basis of said first set of Hall signals, and also generates, as the other of said at least two kinds of duty signals, duty signals with duty factor of ⅓ for each phase of said motor on the basis of said second set of Hall signals, said duty factor of ½ being longer in a lead angle or advanced in a phase angle than that of said duty signal with duty factor of ⅓, and wherein said selecting means selects, for said each phase of said motor, said duty signal with duty factor of ⅓ when the rotation speed of said motor is below a predetermined speed and said duty signal with duty factor of ½ when the rotation speed of said motor is equal to or more than said predetermined speed.

4. A brushless motor control apparatus according to claim 2, wherein said number of phase of said motor is n, a number of poles of said motor is m, said number of each of said first and second sets of Hall sensors is n, each of said first and second sets of Hall sensors are arranged with an angular interval of (360×2)/(n×m) degrees therebetween along an internal periphery of stator of said motor along a rotational direction of said rotor, wherein n and m are positive integer values, and said first set of Hall sensors being shifted from said second set of Hall sensors by an angle of (360×2×2)/(n×m×m) degrees as said desired angle along the rotational direction of said rotor.

5. A brushless motor control apparatus according to claim 2, wherein said number of phase of said motor is 3, a number of poles of said motor is 8, said number of each of said first and second sets of Hall sensors is 3, said Hall sensors of each of said first and second sets of Hall sensors are arranged with an angular interval of 30 degrees therebetween along an internal periphery of a stator of said motor along a rotational direction of said rotor, and said first set of Hall sensors being shifted from said second set of Hall sensors by an angle of 7.5 degrees as said desired angle along the rotational direction of said rotor.

6. A brushless motor control apparatus according to claim 2, wherein said number of phase of said motor is 3, wherein said number of each of said first and second sets of Hall sensors is 3, wherein said three Hall sensors of each of said first and second sets of Hall sensors generate Hall signals of U-, V- and W-phases, respectively, wherein said duty signal generating means generates a signal which rises in synchronism with a rising of said U-phase Hall signal of said first set of Hall signals and falls in synchronism with a rising of said V-phase Hall signal of said first set of Hall signals as a U-phase duty signal with duty factory of ⅓, a signal which rises in synchronism with a rising of said V-phase Hall signal of said first set of Hall signals and falls in synchronism with a rising of said W-phase Hall signal of said first set of Hall signals as a V-phase duty signal with a duty factor of ⅓, a signal which rises in synchronism with a rising of said W-phase Hall signal of said first set of Hall signals and falls in synchronism with a rising of said U-phase Hall signal as a W-phase duty signal of said first set of Hall signals with a duty factor of ⅓, a signal which is a phase inverted signal of said V-phase Hall signal of said second set of Hall signals as a U-phase duty signal with a duty factor of ½, a signal which is a phase inverted signal of said W-phase Hall signal of said second set of Hall signals as a V-phase duty signal with a duty factor of ½, a signal which is a phase inverted signal of said U-phase Hall signal of said second set of Hall signals as a W-phase duty signal with a duty factor of ½, and wherein said selecting means selects said U-, V-, and W-phase duty signals with duty factors of ⅓ when the rotation speed of said motor is below said predetermined speed, and selects said U-, V-, and W-phase duty signals with duty factors of ½ when the rotation speed of said motor is equal to or more than said predetermined speed.

* * * * *